US012014838B2

(12) United States Patent
Rotsch et al.

(10) Patent No.: US 12,014,838 B2
(45) Date of Patent: Jun. 18, 2024

(54) RADIOISOTOPE TARGET STATION

(71) Applicant: UCHICAGO ARGONNE, LLC, Chicago, IL (US)

(72) Inventors: David A. Rotsch, Montgomery, IL (US); Nicholas A. Smith, Lockport, IL (US); David A. Ehst, Downers Grove, IL (US); Sergey A. Chemerisov, Lisle, IL (US); Jerry A. Nolen, Jr., Chicago, IL (US); Michael Alexander Brown, Chicago, IL (US); James J. Grudzinski, Downers Grove, IL (US); James L. Bailey, Hinsdale, IL (US); Ronald T. Kmak, Homer Glen, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 342 days.

(21) Appl. No.: 16/113,817

(22) Filed: Aug. 27, 2018

(65) Prior Publication Data

US 2020/0066418 A1 Feb. 27, 2020

(51) Int. Cl.
*G21G 1/12* (2006.01)
*G21G 1/10* (2006.01)
*G21K 5/08* (2006.01)

(52) U.S. Cl.
CPC ................. *G21G 1/12* (2013.01); *G21G 1/10* (2013.01); *G21K 5/08* (2013.01)

(58) Field of Classification Search
CPC ... G21C 1/00; G21C 1/04; G21C 1/10; G21C 1/12; G21C 4/06; G21K 5/04; G21K 5/08; G21K 5/10; G21G 1/0005; G21G 1/10; G21G 1/12
See application file for complete search history.

(56) References Cited

U.S. PATENT DOCUMENTS

| | | | | |
|---|---|---|---|---|
| 6,907,106 | B1 | 6/2005 | McIntyre et al. | |
| 10,006,101 | B2 * | 6/2018 | Stoner | G21G 1/12 |
| 2007/0297554 | A1 * | 12/2007 | Lavie | G21G 1/10 376/190 |
| 2009/0090875 | A1 * | 4/2009 | Gelbart | H05H 6/00 250/492.1 |
| 2012/0219100 | A1 * | 8/2012 | Lagunas-Solar | C01B 7/14 376/189 |
| 2012/0281799 | A1 * | 11/2012 | Wells | G21G 1/12 376/157 |
| 2014/0348284 | A1 * | 11/2014 | Diamond | G21G 1/001 376/186 |
| 2016/0040267 | A1 | 2/2016 | Stoner et al. | |
| 2019/0259505 | A1 * | 8/2019 | Murakami | G21G 1/0005 |
| 2019/0348190 | A1 * | 11/2019 | Ullrich | H05H 6/00 |
| 2020/0029420 | A1 * | 1/2020 | Ylimaki | G21G 1/10 |
| 2020/0043621 | A1 * | 2/2020 | Comor | G21G 1/0005 |

* cited by examiner

*Primary Examiner* — Sharon M Davis
(74) *Attorney, Agent, or Firm* — CHERSKOV FLAYNIK & GURDA LLC

(57) ABSTRACT

A system for producing and harvesting radioisotopes is provided, the system having a converter housing defining a first beam window; a converter carrier and cartridge in slidable communication with the converter housing; a target housing positioned downstream from the converter housing, the target housing defining a second beam window; and a target carrier in slidable communication with the target housing.

17 Claims, 6 Drawing Sheets

RADIOISOTOPE TARGET STATION

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to medical isotope production and more specifically, this invention relates to a system and method for producing large quantities of isotopes while maximizing worker safety.

2. Background of the Invention

Radioisotopes have many uses, including medical treatments, nondestructive testing, and defense. Linear accelerators (linacs) are sources for the production of radioisotopes. Unlike common particle (proton, deuteron, or other light ion) accelerators, electron linear accelerator-production requires the use of a convertor to convert the incident electron beam into photons. The photons then impinge upon and induce nuclear reactions within a target, thereby rendering the desired isotope.

The afore-described systems are capable of generating large amounts of energy, for example up to 100 kW. Pool-type irradiation systems are used in large high-energy accelerator facilities like Brookhaven National Laboratory and Los Alamos National Laboratory to dissipate this heat. However, pool-type systems require significant infrastructure upgrades or complete remodeling of the irradiation/experimental halls. This entails the construction of new buildings or costly additions to existing buildings.

Furthermore, conventional facilities require personnel to physically manipulate the target or remote systems that use pneumatics to transport the target into hot cells.

State of the art technologies generally require extensive infrastructure costs in which the facility is built around the technology. Therefore, such state of the art is not feasible for pre-existing facilities without these capabilities.

Many accelerator facilities have relatively small irradiation areas where compact irradiation setups are required. However these setups only enable the production of small quantities if direct physical manipulation of the irradiated target by personnel is required to retrieve the target.

There are no universal target stations for linacs that enable production of large quantities of radioisotopes while minimizing dose to workers, except for those available for commercially available particle accelerators.

A need exists in the art for a modular system and method for producing radioisotopes. The system and method should be adapted to be received at the end of any beam line for routine production and distribution of isotopes. The system and method should be capable of receiving targets ranging from milligrams to more than 100 grams, those targets defining a variety of geometries. Also, the system and method should minimize dose to workers.

SUMMARY OF INVENTION

An object of the invention is to provide a system and method for producing radioisotopes that overcomes many of the drawbacks of the prior art.

Another object of the invention is to provide a modular system and method for efficiently producing radioisotopes. A feature of the invention is that it is adapted to be received by the downstream end of a typical linac beam line. An advantage of the invention is utilization of both a small beam and target diameter. An advantage is that a very high power density results in efficiently producing medical isotopes.

Still another object of the invention is to provide a modular system and a method for producing radioisotopes. Features of the invention include separate converter and target housings and pedestals. An advantage of the invention is that a myriad of different converters can be utilized on the same system and at higher beam powers. Another advantage is that the housings may be cooled at different rates and with sole purpose cooling stations. These sole purpose cooling stations enable variability in cooling temperature and flow between the modular components of the station.

Briefly, as shown in FIG. 1, a system for producing radioisotopes is provided, the system comprising a converter housing 14 defining a first beam window 23; a converter carrier and cartridge in slidable communication with the converter housing; a target housing 12 positioned downstream from the converter housing, the target housing defining a second beam window 18; and a target carrier 26 in slidable communication with the target housing.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
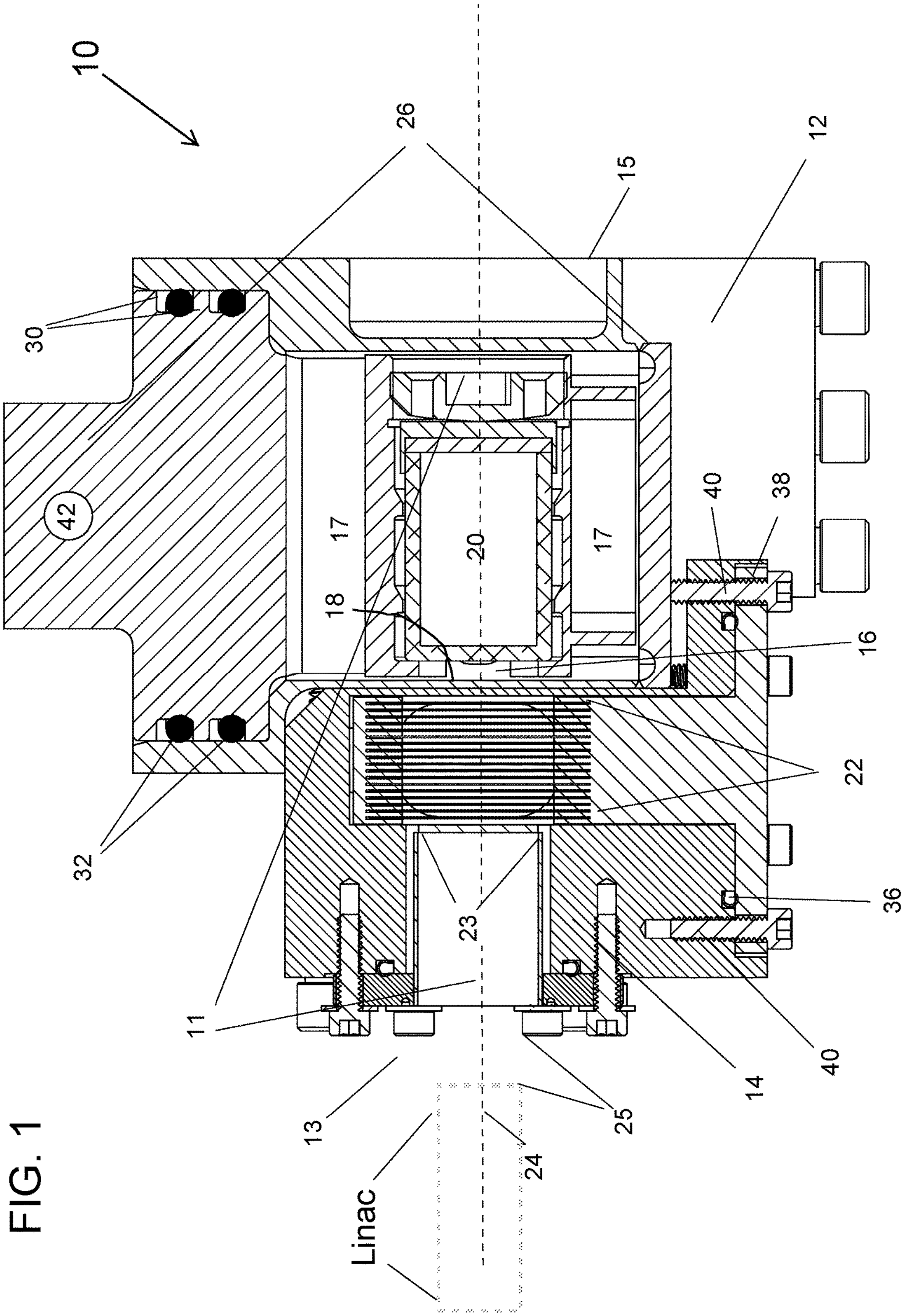
FIG. 1 is cutaway elevation of a system for producing radioisotopes, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a modular universal target station that is adapted to any beam line terminated with a window. This configuration is typical of electron linear accelerators. The radioisotope target station (RITS) is modularized to adapt to changing project and beam line configurations.

A primary purpose of the invention is to provide a method and system for producing isotopes for cancer therapy. As such, the invention enables the production of medical isotopes selected from the group consisting Cu-67, Ac-225, Sc-47, Re-188, Re-186, As-76, As-77, Lu-177, Rh-105, Au-196, Pt-195m, and combinations thereof. As such, the system and method may accommodate a myriad of different converter and target substrates to arrive at the target isotope.

There are six main components of the system: a target holder, a target housing, a convertor cartridge, a convertor housing, a beam entrance window, and a shielded retrieval vessel. Generally, the first five components are arranged to form or be in fluid communication with a longitudinally extending tunnel 11. The tunnel 11 has a first upstream end 13 adapted to receive an electron beam, and a second downstream end 15 adapted to allow electrons and other particles to exit. A target (20 in FIG. 1) is placed within the tunnel 11, and proximal to the second end 15 so that it is generally coaxial to the tunnel and therefore any particle beam traversing the tunnel.

The housing units are completely shielded except for the electron beam entrance window 23. A narrow air gap 25 allows the electron beam exiting the LINAC to enter the stand alone system 10. This shielding minimizes the dose to workers during target retrieval. For example, the target is retrieved by remote actuation of a mechanical arm that raises the target out of the target housing and into a shielded transfer cask. As such, the worker is never exposed to a direct irradiation environment caused by the target or the converter.

FIG. 1 is an elevated interior view of the invented target station, generally designated as numeral 10. The station 10 comprises a target station housing 12 positioned downstream from a converter housing 14, relative to an incoming beam line 24. The planes defining the converter plates 22 are arranged parallel with each other (and perpendicular to the path of the incoming photon beam) and stacked within the converter housing such that the beam traverses the longitudinal axis of the stack. The plates may or may not be contacting each other. Generally, the plates are arranged relative to each other to allow cooling to flow between them. Such spacing is dependent on the plate sizes.

The target and converter housings define coolant channels 16 adapted to receive fluid. Generally, the coolant traverses the housings at a rate and at a temperature to maintain the temperature of the housings below the boiling point of the coolant and/or below the melting point of the lowest melting point constituent of the housing. (In instances where water is used as a coolant, temperatures are maintained below 100° C. In instances where the housing is comprised of aluminum, temperatures are maintained below about 600° C. inasmuch as aluminum melts at 660° C.

The coolant comes in direct contact with the convertor plates 22, but not with the target material 20. The target material is encapsulated and that capsule (element 27 in FIG. 2 and FIG. 3) comes into contact with the coolant.

A myriad of coolants are suitable for regulating the temperature of the system 10. Generally, the coolants are fluids with boiling points at or above about 100° C., including but not limited to water, ethylene glycol, diethylene glycol or propylene glycol, and combinations thereof. The system is also adapted to receive pressurized gas, such as pressurized Helium, as a cooling means.

Inasmuch as coolants are supplied under pressure, optionally, thinner aspects of the system, such as the upstream and downstream windows allowing for ingress and egress of the beam, are configured to prevent rupture. For example, the downstream end of the ingress window (23 in FIG. 2) of the converter housing 14 may have a convex topology relative to the interior void defined by the converter housing to withstand coolant fluid pressures. The window may have a thickness of 2 mm or less. Such thin windows prevent excessive electron scatter from the initial beam and also minimize material interactions with the beam. This minimizes heat deposition.

Figure 2:
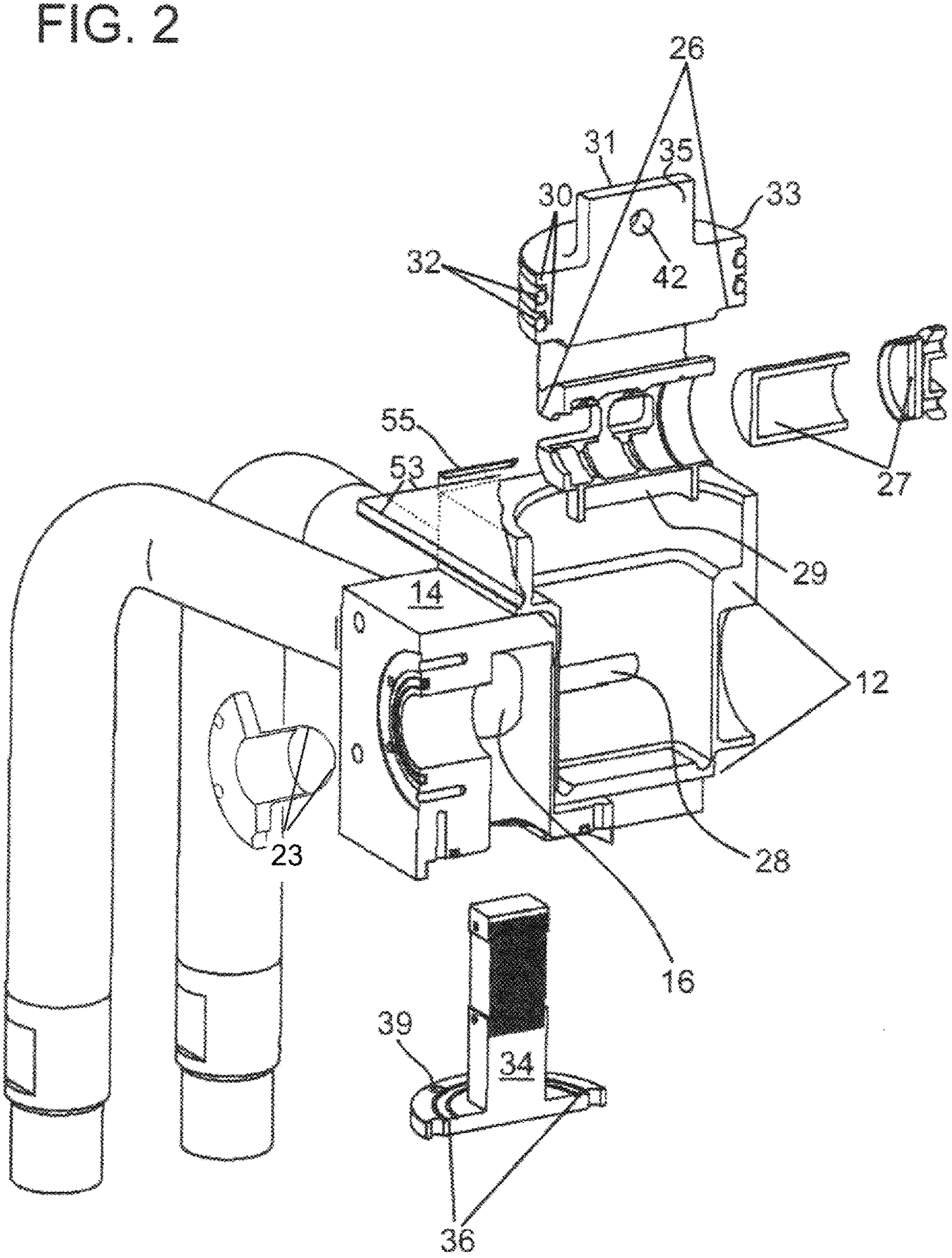
FIG. 2 is an exploded view of the aforementioned system, in accordance with features of the present invention.

FIG. 2 is an exploded view of the system 10. This expanded view is provided to more clearly depict the coolant passages throughout the system, including an upstream or front flow channel 16 (which is formed within the converter housing 14), and target station coolant passages 17 and 28 (which are formed within the target station housing).

FIG. 2 also shows a target carrier 26 in slidable communication with a top portion the target housing 12. This top loading configuration allows "hot swapping" of the irradiated target for a yet converted target, the irradiated target subsequently being placed into a standard hot cell.

A depending end 29 of the target carrier shown facing downwardly to oppose the top portion of the target housing is adapted to receive a target capsule 27. The capsule is generally received within the target carrier such that its longitudinal axis is coaxial to the incoming electron beam. As such, the longitudinal axis of the capsule 27 is generally perpendicular to the longitudinal axis of the target carrier.

The assembly 26 may be hermetically sealed with the housing via commercial means. For example, proximal to and integrally molded with a second superior end 31 of the target carrier is a region forming a truncated cylinder defining a periphery 33. The periphery 33 may define annular grooves 30 adapted to receive 0-rings 32, those O-rings adapted to frictionally engage medially facing surfaces of the target housing station. Alternatively, the target carrier 26 may seal with the target housing via a male-female thread and groove configuration.

The superior end 31 of the target carrier may define an upwardly projecting tongue 35 with a region forming an aperture 42. The aperture 42 would serve as a grasping point for a crane or other means for harvesting the target carrier 26 from the target station. Discussion of the harvesting means is found infra, associated with FIGS. 4 and 5 descriptions.

Figure 4:
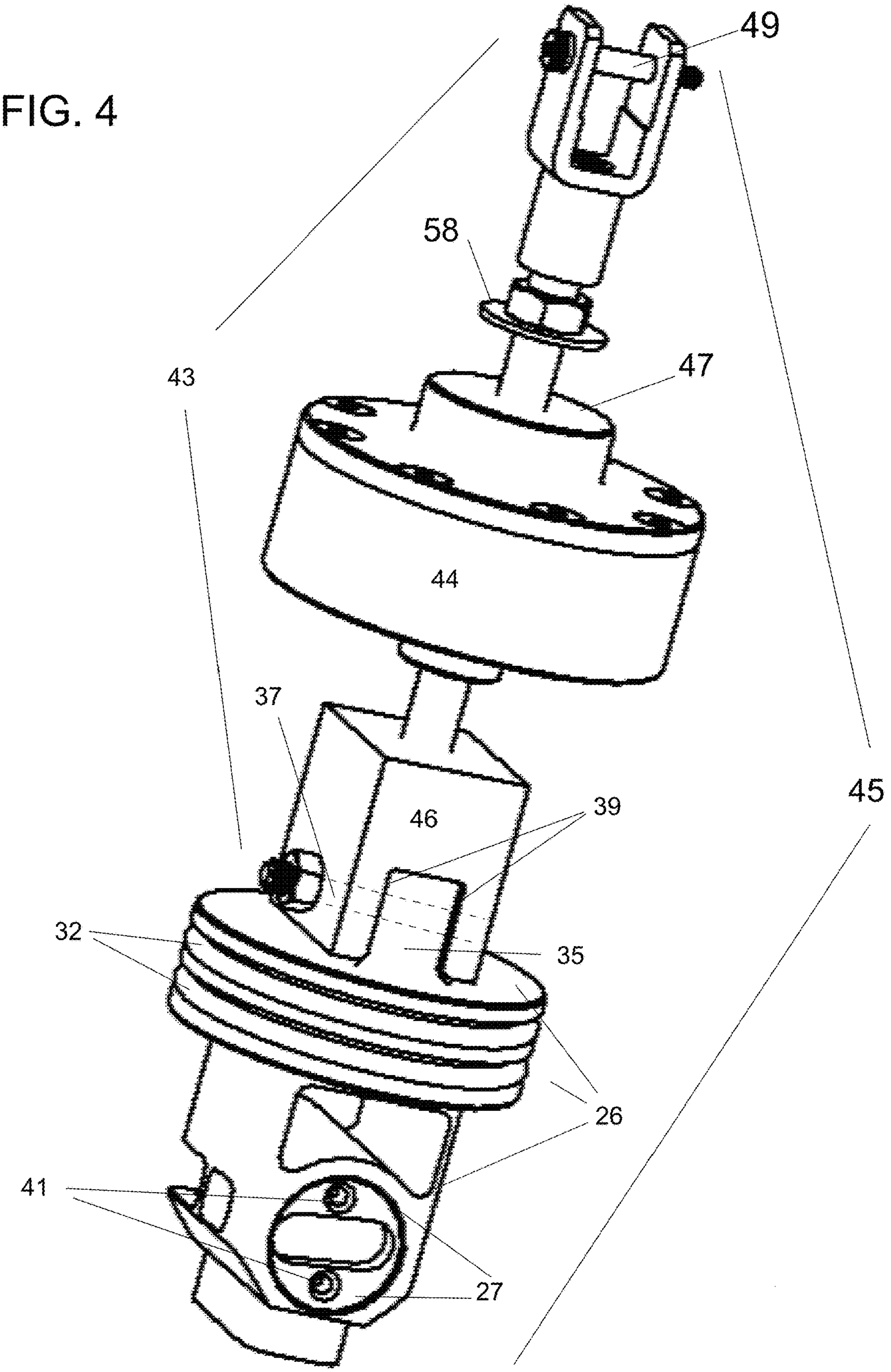
FIG. 4 is a perspective view of a target carrier in communication with a transport mechanism, in accordance with features of the present invention.

A purpose of the target carrier 26 is to stabilize the target in relationship to the incoming beam when coolant is flowing over the target. Also, the target capsule 27 is removably secured within the tunnel 11 via a plurality of fastening means. (FIG. 4 shows the capsule 27 nested within the target carrier 26.) This fastening means is to prevent rattling of the capsule within the target carrier during coolant operations, inasmuch as such cavitation may otherwise damage the system. A suitable fastening means is a male-female threaded configuration, whereby for example circumferential surfaces of the target capsule 27 are threadably received by medially facing surfaces of the target carrier 26. Capsule tool grab points 41 may be provided to rotate or otherwise manipulate the capsule 27 during its installation and removal from the target carrier 26.

The aforementioned converter plates 22 may be positioned on a pedestal or other support 34, the support slidably received by an underside of the converter housing 14 so as to load perpendicular to the tunnel 11. A depending end of the support may be sealed to the housing 14 by one or a plurality of metal (e.g., Al or Au) O-rings 36 received by annular grooves formed in the cartridge support 34. Transverse apertures 38 are formed in regions of the support and in registration with depending surfaces of the housing and adapted to receive fasteners 40 such as screws. The screws fasten the converter support 34 to the housing 14.

This removably receivable support 34 is construed in this specification as the converter "cartridge." The cartridge 34 is adapted to receive a myriad of different types of plates, including plate geometries and plate constituencies. The cartridge 34 may be in thermal communication with the converter housing 12 so as to receive the benefit of coolant coursing through the house. Alternatively, or in addition, the cartridge 34 may define coolant fluid passageways.

Figure 3:
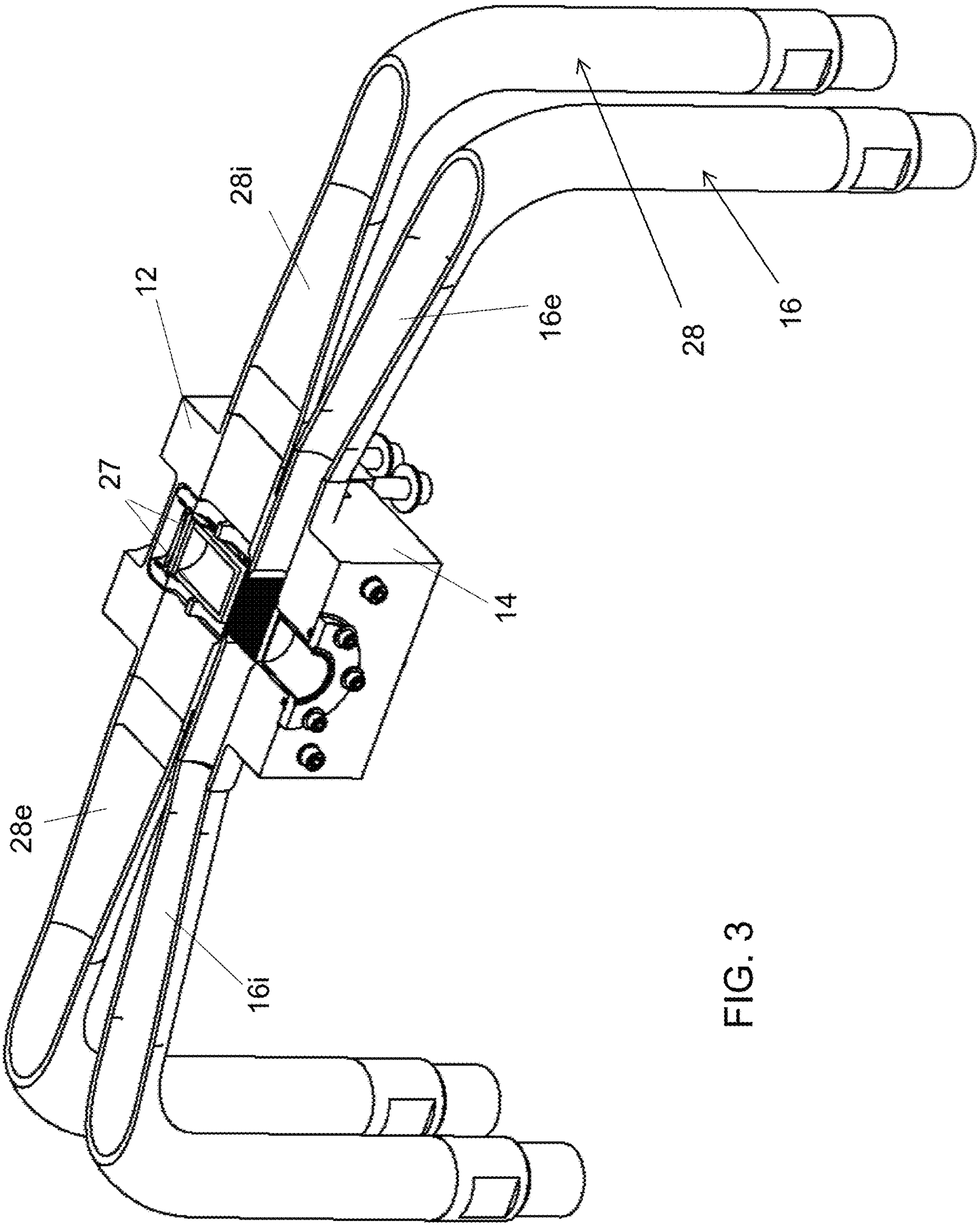
FIG. 3 is a view of a system for producing radioisotopes, the view depicting cooling conduits, in accordance with features of the present invention.

FIG. 3 is a perspective view of the assembled system 10 but with a plurality of coolant fluid conduits 16 and 28 radiating therefrom. The system is depicted with a separate fluid ingress and egress line for each of the housings. For example, a first fluid ingress line 16*i* provides coolant to the converter housing 14 while a first fluid egress line 16*e* removes fluid from the converter housing. Similarly, a second fluid ingress line 28*i* provides coolant to the target housing 12 while a second fluid egress line 28*e* removes coolant from the target housing. The first coolant line 16 and second coolant line 28 are depicted with coolant running in opposite directions. This accommodates coolant leaving the first line to enter the second line, or vice versa. Alternatively, the first coolant line may be charged with a different coolant fluid volume at a different pressure and pressure such that the depicted counter coolant flow is not necessary. Alternatively, the coolant lines may be charged with the same coolant fluid with the coolant running in the same directions.

The two major components of the system, i.e., the converter housing and the target housing, may be integrally molded as one piece. Integral molding optimizes thermal transfer during cooling and minimizes the material between the convertor plates and the target.

Alternatively, the system may be completely modular, whereby the converter housing is reversibly attached to the target housing). Such a reversibly attached configuration allows one housing (for example the hotter converter housing) to be cooled first without effect to the other, target housing. This results in less cooling required on the target. Also, having a target housing separate from the converter housing allows either housing to continue to be utilized when the other housing becomes obsolete.

The components of the system are optimized for heat transfer. For example, the beam entrance window into the converter is fabricated to thicknesses of between 0.1 mm and 2 mm. Different material or the window may be utilized to maximize heat transfer, such high thermally conductive material as aluminum, titanium, copper, beryllium and steel. Given the modularity of the converter housing and the converter pedestal, converter size may be increased. Current converter sizes in state of the art range from 0.2 mm to 1 mm. A feature of the invention is that the converter cartridge may be completely removed and replaced with a cartridge that holds different converter plates. Similarly, the window may be modular and thus reversibly received by its mating aperture defined by the converter housing.

Target Retrieval

Detail

FIG. 4 depicts the target carrier 26 connected to a means for removing the assembly from the target station 10. Initially, the superior end 31 of the assembly is reversibly attached to a depending end 46 of an actuating arm 43 such as a crane or other type of mechanical actuator. (Positioned midway between the depending end and superior end of the actuating arm is a shielding block 44.)

The depending end of the actuating arm 43 may be configured as a hook block or channel adapted to receive the aforementioned tongue 35. A bolt, rod 37 or other means for removably attaching the tongue 35 of the target carrier 26 to the depending end 46 of the actuating arm may be utilized to secure the target station to the crane, whereby the bolt is slidably received by transverse apertures formed in the channel 39 lying in registration with the aperture 42 formed in the tongue 35.

The resulting construct, comprising the target carrier attached to the actuating arm is designated as the target tree 45.

Figure 5:
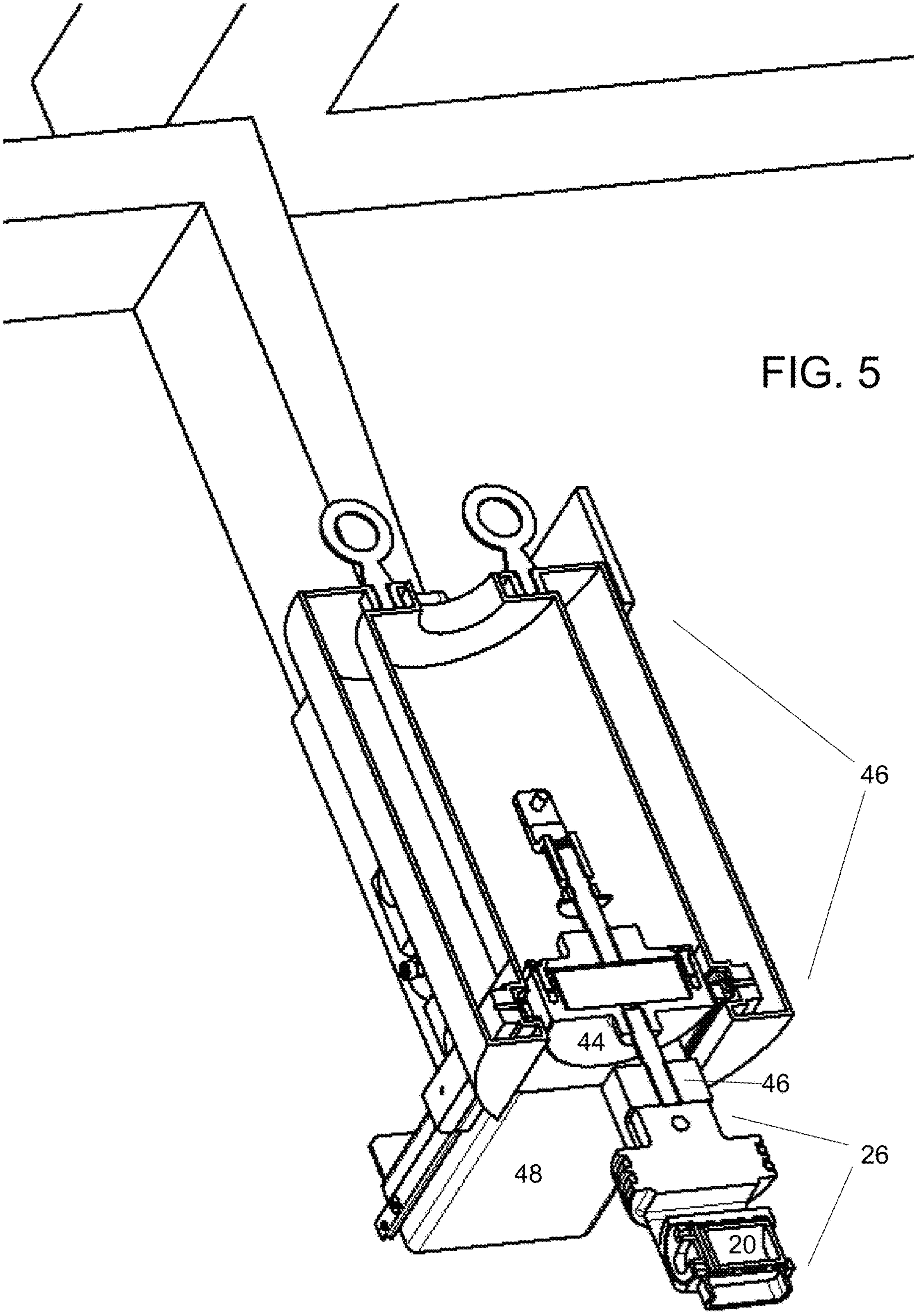
FIG. 5 is cut-away perspective view of the target holder being loaded into a transfer cask from a target housing, or loaded into the target housing from the transfer cask, in accordance with features of the present invention.

During target retrieval, the worker removes a rod 49 fastening means such as a cotter key/clevis pin or similar anchoring means. The rod 49 is removed and the target tree is uncoupled from the actuating arm. Then, the worker secures the target within a transfer cask 46 (FIG. 5). Specifically, the worker closes two shielded, sliding doors (one sliding door 53 depicted in cutaway view in FIG. 2 in slidable communication with the top of the transfer station and one on the transfer cask) and removes the shielded transfer cask to process the target in another location. A periphery of the transfer station may support a rail or groove 55 adapted to slidably receive the door 53.

FIG. 5 is a cut-away perspective view of the target station 26 being loaded into a transfer cask 46. The cross section of the transfer cask 46 is depicted as slightly larger than the cross section of the shielding block 44, so as to slidably receive (and optionally frictionally interact with) the block and the attached target carrier 26. The shielding block 44, so nested within the transfer cask, prevents radiation leakage from the irradiated target to regions outside of the cask.

Figure 6:
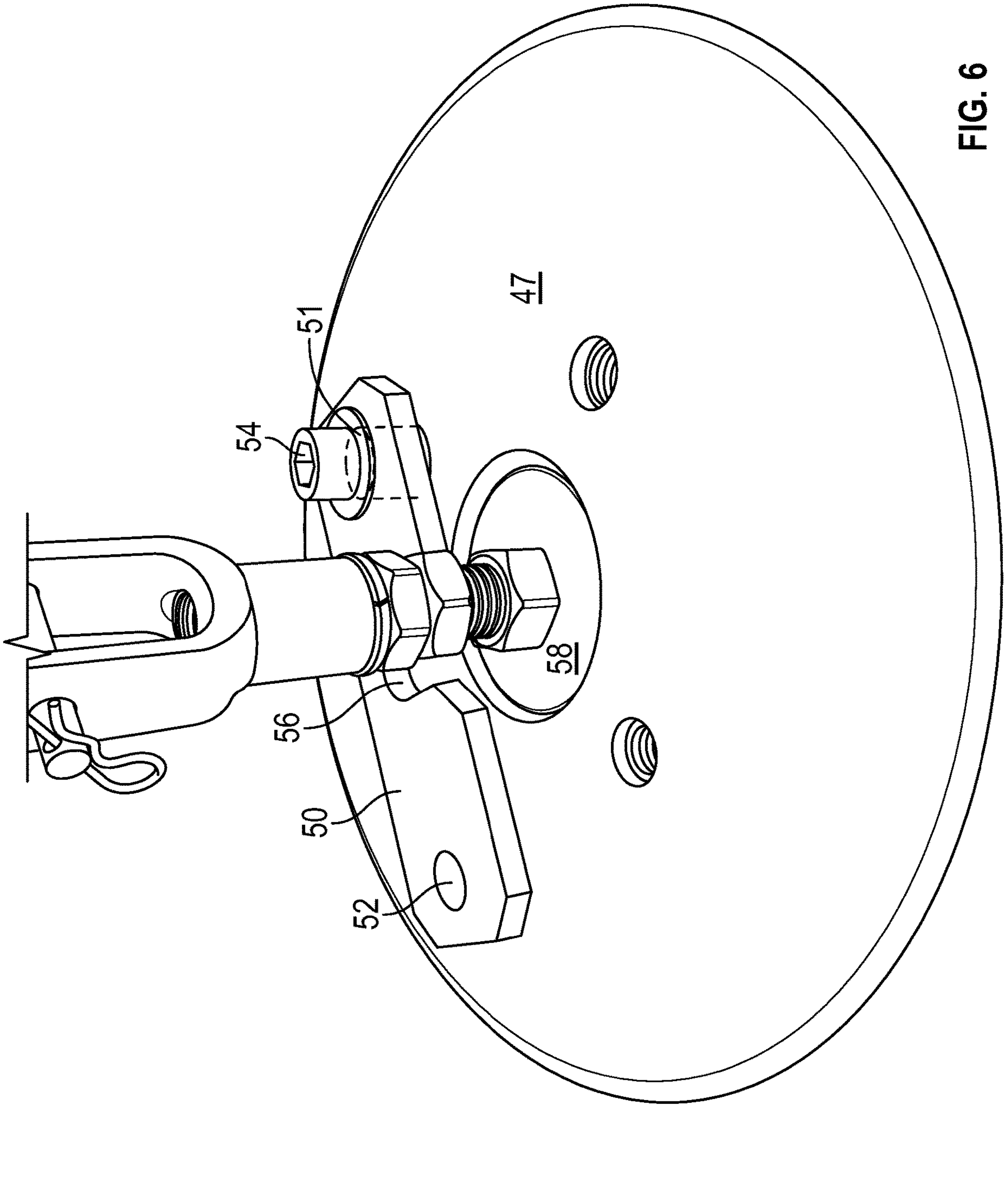
FIG. 6 is a perspective view of a fastening mechanism, in accordance with features of the present invention.

FIG. 6 illustrates a means for securing the target tree 45 within the transfer cask 46. Generally, this securing means is a latch comprising an elongated substrate 50 in pivotal communication with the top 47 of the transfer cask 46. The elongated substrate 50 defines a first proximal end in pivotal communication with the cask whereby that first end of the substrate defines a first aperture 51 positioned over a region of the top of the cask forming a virtually identical but threaded aperture. The two apertures, thereby lying in registration are then adapted to receive a threaded bolt 54 such that the substrate is attached to the top 47 of the cask in a male-female threaded paradigm.

A second distal end of the elongated substrate may also define a second similar aperture 52. Approximately midway between the first and second ends the substrate defines a notch 56 adapted to transversely receive a region of the target tree such that that region of the target tree nests within the notch 52. FIG. 6 depicts the notch not engaging the region of the tree.

To nest or otherwise engage the tree with the elongated substrate 50, the user moves the distal end 52 of the substrate toward the midline of the cask 46. This will position the elongated substrate beneath an overhang or moveable support mechanism such as a nut (58 in FIG. 4) that is coaxial with the tree. The overhang or moveable support is then lowered to rest on 50 and support the weight of 45. In this way, 45 is completely supported by 50.

Example 1

An RITS was built for routine production of Cu-67. The production of Cu-67 with this system was demonstrated by producing Cu-67 from natural and enriched zinc targets. A 100 g natural zinc target was irradiated for 6 hours at 40 MeV with a beam power of 6 kW and beam spread of 10.2 mm (full width half max, FWHM) to produce 30 mCi of Cu-67 (isolated post chemical processing). The coolant was water with a flow of 35 gpm.

Example 2

A 100 g enriched zinc-68 target was irradiated for 7 hours at 40 MeV with a beam power of 7 kW and beam spread of 10.7 mm (FWHM) to produce 110 mCi of Cu-67 (isolated post chemical processing). The coolant was water with a flow of 34 gpm.

Thermocouples were placed at key strategic points to monitor coolant temperature and beam stop temperatures. All temperatures remained below 100 C. The coolant temperature in/out was monitored. Prior to the start of the irradiation, the coolant temperature was 15.7 C. During the irradiation the highest temperature of the coolant was found to be 19.5 C. Coolant boiling was not observed. The highest beam stop temperature recorded was 171 C.

These demonstrations were limited to <200 mCi Cu-67 to conservatively limit personnel dose during chemical processing. Theoretically, >2 Ci Cu-67 can be produced within a 48 hr irradiation with a 40 MeV beam at 10 kW beam power and beam spread of 10 mm FWHM.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system positioned at a downstream end of a LINAC for producing radioisotopes, the system comprising:

a) a modular converter housing having an upstream end having a first window and a downstream end, wherein the upstream end opposes and is physically separated by an air gap from a downstream end of the LINAC;

b) a converter carrier supporting converter plates, the converter slidably disposed in an aperture in an underside of the converter housing;

c) a modular target housing positioned downstream from, and separate from, and reversibly attached to the converter housing, the target housing having a second window; and d) a target carrier including a target capsule encapsulating target material, wherein the target capsule is removably fastened to the target carrier to prevent rattling of the capsule within the target carrier and the target carrier is slidably disposed in an aperture in a top side of the housing, wherein the converter housing and the target housing define a tunnel receiving a particle beam emanating from the LINAC, wherein the tunnel is coaxial to the particle beam.

2. The system as recited in claim 1 wherein the target carrier comprises an upwardly projecting tongue with an aperture to serve as a grasping point for an overhead crane, whereby the target carrier is inserted from the top of the target housing.

3. The system as recited in claim 2 wherein insertion of the target carrier in the target housing is controlled remotely.

4. The system as recited in claim 1 further comprising a converter housing coolant inlet, a converter housing coolant outlet, a target housing coolant inlet and a target housing cooling outlet.

5. The system as recited in claim 4 wherein a first coolant fluid flows into the converter housing via the converter housing coolant inlet and physically contacts the plates.

6. The system as recited in claim 5 wherein a second coolant flows into the target housing via the target housing coolant inlet and contacts the target capsule and the first coolant fluid is different than the second coolant fluid.

7. The system as recited in claim 4 wherein a first coolant fluid flows into the converter housing via the converter housing coolant inlet and contacts the converter plates and flows into the target housing via the target housing coolant inlet and contacts the target capsule.

8. The system as recited in claim 1 wherein the target capsule is disposed at the bottom end of the target carrier so that the target capsule intersects the particle beam line when the target carrier is seal to the aperture of the target housing.

9. The system as recited in claim 1 wherein the target capsule contains between 1 mg and 100,000 mg of the target material.

10. The system as recited in claim 1 wherein the first window has a convex side facing the converter plates.

11. The system as recited in claim 1 wherein the first window has a flat topography relative to the upstream end.

12. The system as recited in claim 1 wherein the beam comprises an incident electron beam having an energy ranging from 0 MeV to 100 MeV.

13. The system as recited in claim 1 wherein the beam comprises an incident electron beam having a beam power ranging from 0 kW to 100 kW.

14. The system as recited in claim 1 wherein the target capsule is cylindrical and has a longitudinal axis that is parallel to the particle beam.

15. The system as recited in claim 1 wherein the converter carrier is removably received by the converter housing.

16. The system as recited in claim 1 wherein the converter carrier is configured to receive different types of converter plates and plate geometries.

17. The system as recited in claim 1 wherein the converter carrier slidably communicates with the converter housing in a direction that is perpendicular to the tunnel.

* * * * *